(12) United States Patent
Mills et al.

(10) Patent No.: US 9,270,090 B2
(45) Date of Patent: Feb. 23, 2016

(54) GROUNDED CIRCUIT BREAKER PANEL ELECTRICAL MODULE AND METHOD FOR GROUNDING SAME

(75) Inventors: Patrick Wellington Mills, Bradenton, FL (US); Kevin Francis Hanley, Bradenton, FL (US); James Michael McCormick, Bradenton, FL (US); Richard George Benshoff, Sarasota, FL (US)

(73) Assignee: Labinal, LLC, Denton, TX (US)

( * ) Notice: Subject to any disclaimer, the term of this patent is extended or adjusted under 35 U.S.C. 154(b) by 261 days.

(21) Appl. No.: 14/125,382

(22) PCT Filed: Jun. 26, 2012

(86) PCT No.: PCT/US2012/044196
§ 371 (c)(1),
(2), (4) Date: Dec. 11, 2013

(87) PCT Pub. No.: WO2013/003345
PCT Pub. Date: Jan. 3, 2013

(65) Prior Publication Data
US 2014/0126119 A1    May 8, 2014

Related U.S. Application Data

(60) Provisional application No. 61/501,451, filed on Jun. 27, 2011, provisional application No. 61/503,047, filed on Jun. 30, 2011.

(51) Int. Cl.
*H02B 1/044* (2006.01)
*H02B 1/04* (2006.01)
(Continued)

(52) U.S. Cl.
CPC .................. *H02B 1/044* (2013.01); *H02B 1/04* (2013.01); *H02B 1/16* (2013.01); *H01H 9/12* (2013.01); *H02B 1/056* (2013.01)

(58) Field of Classification Search
CPC .......... H02B 1/044; H02B 1/056; H02B 1/04; H02B 7/00; H01H 71/04; H01H 1/123; H01H 1/0264; H01H 9/12; H01H 9/02
USPC .......... 361/605, 42, 640, 641, 647, 631, 634, 361/636, 637, 644, 673, 62, 624; 200/50.28, 50.32, 293, 296, 295, 200/43.01, 304; 335/170, 172, 253; 439/271, 278, 349, 620, 76.1, 76.2, 439/585–589
See application file for complete search history.

(56) References Cited

U.S. PATENT DOCUMENTS

| 1,321,144 A | 11/1919 | Platt |
| 5,107,237 A * | 4/1992 | Peterson ............... H01F 7/1607 335/170 |

(Continued)

FOREIGN PATENT DOCUMENTS

EP    2254207    11/2010

OTHER PUBLICATIONS

Supplementary European Search report filed in EP 12 80 4643 mailed Jun. 10, 2015.

(Continued)

*Primary Examiner* — Michail V Datskovskiy
(74) *Attorney, Agent, or Firm* — Rankin, Hill & Clark LLP

(57) ABSTRACT

A circuit breaker module is provided. The circuit breaker module includes: a frame assembly, a faceplate assembly, and a number of circuit breakers, the circuit breakers having an electrically conductive surface and an extending handle, the frame assembly having a front member and a back member, the frame assembly front member and the frame assembly back member being spaced from each other and defining an enclosed space, the frame assembly front member being electrically conductive, the faceplate assembly having an electrically conductive faceplate, the faceplate being a planar member with a number of openings therein, the faceplate coupled to the frame assembly front member, the circuit breaker disposed in the frame assembly enclosed space, and wherein the circuit breaker is in electrical communication with the faceplate and the frame assembly front member, whereby a current may pass from the circuit breaker to the frame assembly front member.

15 Claims, 4 Drawing Sheets

(51) Int. Cl.
*H02B 1/16* (2006.01)
*H01H 71/04* (2006.01)
*H02B 1/056* (2006.01)
*H01H 9/12* (2006.01)

(56) References Cited

U.S. PATENT DOCUMENTS

| | | | | |
|---|---|---|---|---|
| 6,066,817 | A * | 5/2000 | Flegel | H01H 73/08 200/296 |
| 6,317,311 | B1 | 11/2001 | Middlehurst | |
| 6,490,150 | B1 * | 12/2002 | Theisen | H01H 9/12 174/51 |
| 6,653,802 | B1 | 11/2003 | Nelson et al. | |
| 7,170,376 | B2 * | 1/2007 | Mills | H01H 71/123 335/202 |
| 7,570,146 | B2 * | 8/2009 | Mills | H01H 71/04 337/101 |
| 7,646,572 | B2 * | 1/2010 | Mills | H02H 1/0015 361/42 |
| 7,736,573 | B2 | 6/2010 | Zimmerman | |
| 8,094,436 | B2 * | 1/2012 | Mills | H02B 1/056 361/634 |
| 8,328,575 | B2 * | 12/2012 | Meux | H02B 1/056 361/634 |
| 2002/0092743 | A1 * | 7/2002 | Whipple | H01H 71/0264 200/50.28 |
| 2008/0011510 | A1 | 1/2008 | Tang et al. | |
| 2008/0129112 | A1 | 6/2008 | Mills | |
| 2009/0310324 | A1 | 12/2009 | Mills et al. | |
| 2010/0296229 | A1 * | 11/2010 | Meux | H02B 1/056 361/605 |

OTHER PUBLICATIONS

United States Patent and Trademark Office, "International Search Report and Written Opinion," Sep. 13, 2012, 9 pp.

* cited by examiner

GROUNDED CIRCUIT BREAKER PANEL ELECTRICAL MODULE AND METHOD FOR GROUNDING SAME

CROSS REFERENCE TO RELATED APPLICATION

This application claims priority from PCT/US2012/044196, filed on Jun. 26, 2012, entitled GROUNDED CIRCUIT BREAKER PANEL ELECTRICAL MODULE AND METHOD FOR GROUNDING SAME, and to U.S. Provisional Patent Application Ser. No. 61/501,451, filed Jun. 27, 2011 entitled, GROUNDED CIRCUIT BREAKER PANEL ELECTRICAL MODULE AND METHOD FOR GROUNDING SAME and U.S. Provisional Patent Application Ser. No. 61/503,047, filed Jun. 30, 2011, entitled, CIRCUIT BREAKER PANEL ELECTRICAL MODULE WITH EMBEDDED SYSTEMS.

BACKGROUND

1. Field

The disclosed concept pertains generally to a faceplate assembly for a circuit breaker module and, more particularly, to a faceplate assembly having a faceplate wherein the faceplate is electrically conductive and the circuit breaker module frame assembly is conductive, whereby circuit breakers within the circuit breaker module may be grounded. The invention also relates to methods of electrically grounding electrical switching apparatus, such as circuit breakers.

2. Background Information

Circuit breakers are used to protect electrical circuitry from damage due to an overcurrent condition, such as an overload condition or a relatively high level short circuit or fault condition between a power source (e.g., a line terminal) and a load. Circuit breakers are used, for example, in aircraft electrical systems where they not only provide over-current protection but also serve as switches for turning equipment on and off. Aircraft or subminiature circuit breakers, for instance, are typically relatively small to accommodate the relatively high-density layout of aircraft circuit breaker panels, which make circuit breakers for numerous circuits accessible to a user. Aircraft electrical systems can consist, for example, of hundreds of circuit breakers, each of which is used for a circuit protection function as well as a circuit disconnection function through a push-pull handle.

Typically, aircraft circuit breaker panels are, at best, poor conductors e.g., such panels are painted; are made of a non-conductive composite material; or are made of an oxidized conductive material, such as aluminum). In order to monitor faults, such as arc faults in aircraft circuit breakers such as, but not limited to, arc fault circuit interrupters (AFCI), there exists the need to power arc fault detection circuitry. Hence, there exists the need to provide a reliable ground connection to the aircraft circuit breaker in addition to the existing line terminal from the power source. There is a further need to make assembling circuit breaker modules simpler.

There is room for improvement in the construction of circuit breaker modules.

SUMMARY

These needs, and others, are met by embodiments of the disclosed concept in which provides a circuit breaker module having a conductive faceplate. The circuit breakers are in electrical communication with the faceplate and it is in electrical communication with the panel via the circuit breaker module frame assembly.

In accordance with one aspect of the disclosed concept, a circuit breaker module structured to be disposed in an electrically conductive panel includes: a frame assembly, a faceplate assembly, and a number of circuit breakers, the circuit breakers having an electrically conductive surface and an extending handle, the frame assembly having a front member and a back member, the frame assembly front member and the frame assembly back member being spaced from each other and defining an enclosed space, the frame assembly front member being electrically conductive, the faceplate assembly having an electrically conductive faceplate, the faceplate being a planar member with a number of openings therein, the faceplate coupled to the frame assembly front member, the circuit breaker disposed in the frame assembly enclosed space, and wherein the circuit breaker is in electrical communication with the faceplate and the frame assembly front member, whereby a current may pass from the circuit breaker to the frame assembly front member.

As another aspect of the disclosed concept, a method of electrically grounding a circuit breaker in a panel, wherein the panel is an electrically conductive material, the circuit breaker disposed in a circuit breaker module, the circuit breaker module including a frame assembly, a faceplate assembly, the circuit breaker having an electrically conductive surface and an extending handle, the frame assembly having a front member and a back member, the frame assembly front member and the frame assembly back member being spaced from each other and defining an enclosed space, the frame assembly front member being electrically conductive, the faceplate assembly having an electrically conductive faceplate, the faceplate being a planar member with a number of openings therein, the faceplate coupled to the frame assembly front member, includes the steps of: disposing the circuit breaker in the frame assembly enclosed space, the circuit breaker being in electrical communication with the faceplate whereby a current may pass from the circuit breaker to the frame assembly front member, and, disposing the circuit breaker module in the panel, the circuit breaker module in electrical communication with the panel, whereby a current may pass from the circuit breaker module to the panel, and wherein the circuit breakers are grounded via being in electrical communication with the panel.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; microcomputer; a central processing unit; a mainframe computer; a mini-computer; a server; a networked processor; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "directly coupled" or "attached" shall mean that the parts are joined together directly.

As used herein, "correspond" indicates that two structural components are sized to engage each other with a minimum amount of friction. Thus, an opening which corresponds to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening.

As used herein, a "coupling" or a "coupling component" is one element of a coupling assembly. That is, a coupling assembly includes at least two elements, or components, that are structured to be coupled together. It is understood that the elements of a coupling assembly correspond to each other or are otherwise structured to be joined together. For example, in a coupling assembly, if one coupling element is a bolt, the other coupling element is a nut. Further, it is understood that the two elements of a coupling assembly may not be described at the same time.

As used herein, and when used in reference to communicating data or a signal, "in electronic communication" includes both hardline and wireless forms of communication.

As used herein, when used in reference to a current or supplying energy, "in electrical communication" means there is a conductive path between the identified elements.

The disclosed concept is described in association with a circuit breaker panel for aircraft circuit breakers, although the disclosed concept is applicable to a wide range of circuit breaker panels.

Figure 1:
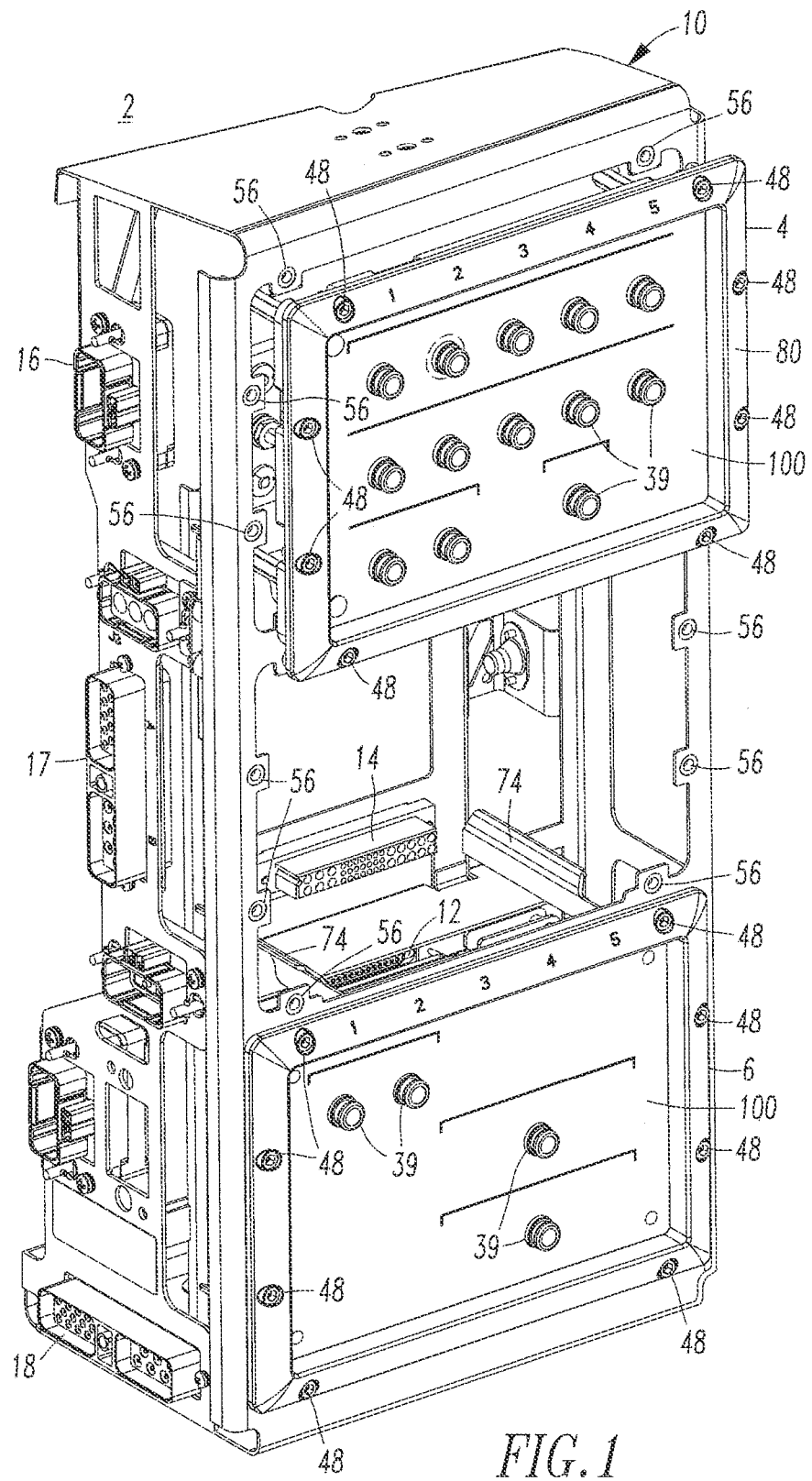
FIG. 1 is a front vertical isometric view of a circuit breaker panel with one circuit breaker module removed to show internal structures in accordance with embodiments of the disclosed concept.
Figure 2:
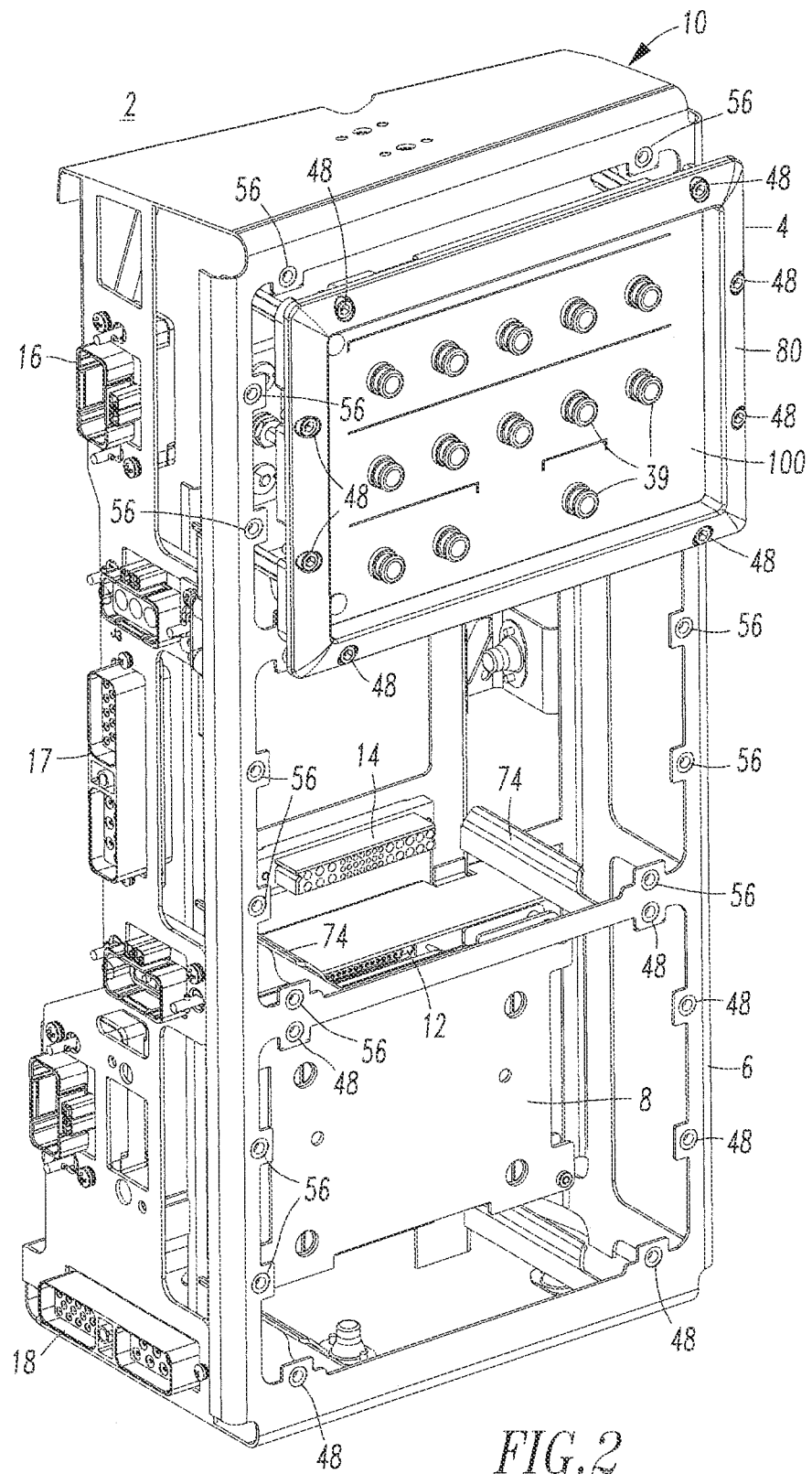
FIG. 2 is another view of the circuit breaker panel of FIG. 1 with two circuit breaker modules removed to show internal structures in accordance with embodiments of the disclosed concept.

Referring to FIGS. 1 and 2, a circuit breaker panel 2 includes a number of circuit breaker modules 4, 5, and 6 (e.g., without limitation, two exemplary DC circuit breaker modules 4 and 5 and an exemplary AC circuit breaker module 6, are shown) each having a connector (FIG. 3), a monitoring module 8 having a connector (not shown), and a frame 10 including a first connector 12 coupled to the frame 10 for the monitoring module 8 and structured to removably, electrically and mechanically engage the monitoring module connector. The circuit breaker panel 2 is made from a conductive material such as, but not limited to aluminum. The circuit breaker panel 2 is in electrical communication with the aircraft chassis. As such, the circuit breaker panel 2 is grounded.

The circuit breaker panel 2 further includes a number of second connectors 14 coupled to the circuit breaker panel frame 10 for the number of circuit breaker modules 4, 6. Each of the number of second connectors 14 is structured to removably, electrically and mechanically engage the connector of a corresponding one of the number of circuit breaker modules 4, 6. A number of third connectors 16, 17, 18 are coupled to the circuit breaker panel frame 10. As is known, the circuit breaker panel 2 also includes a plurality of conductors (not shown) which electrically connected the various connectors 12, 14. The conductors are further electrically connected between one of a number of third connectors 16, 17, 18 (e.g., for connection to an AC load or DC load). Additional details of the circuit breaker panel 2 are shown and described in U.S. patent application Ser. No. 13/086,442, filed on Apr. 14, 2011, which is assigned to Eaton Corporation and incorporated herein by reference.

Each of the number of circuit breaker modules 4, 6 also includes a number of fasteners 48. The circuit breaker panel frame 10 also includes a number of apertures 56, each aperture 56 cooperating with one of the number of fasteners 48 of a corresponding one of the number of circuit breaker modules 4, 6 to removably couple the corresponding one of the number of circuit breaker modules 4, 6 to the circuit breaker panel frame 10.

Figure 3:
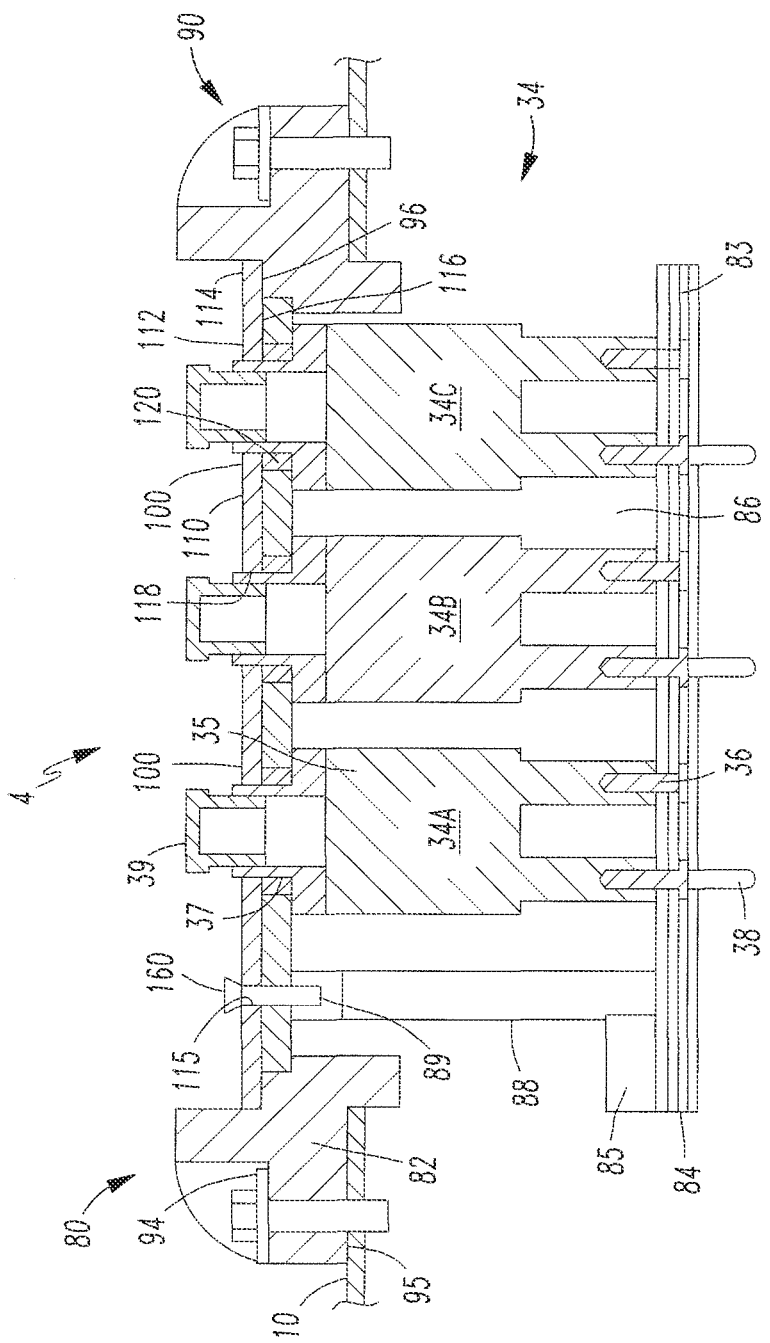
FIG. 3 is a detailed view of the circuit breaker panel according to an embodiment of the disclosed invention.
Figure 4:
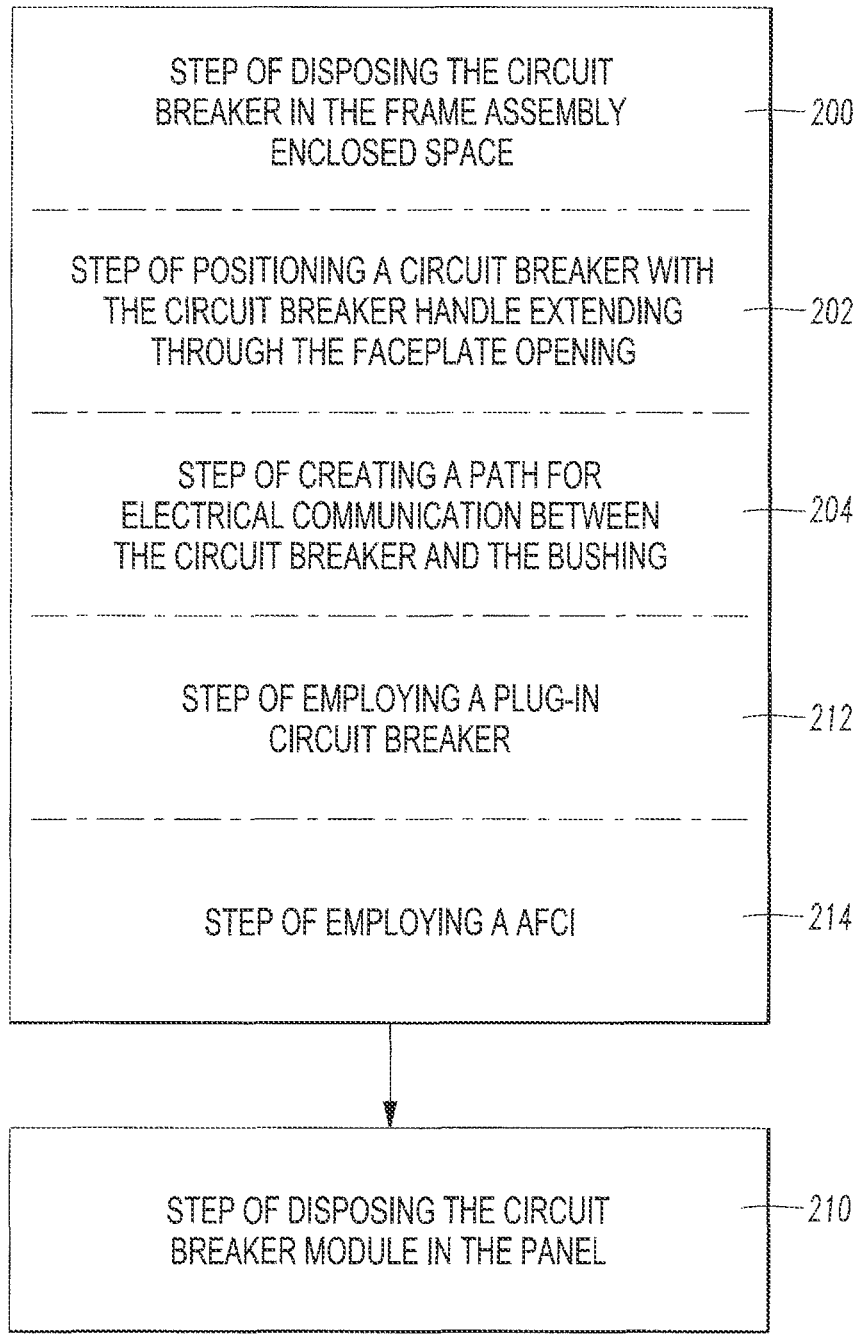
FIG. 4 is a flow chart of the steps associated with assembling a circuit breaker module.

As shown in FIG. 3, each of the number of circuit breaker modules 4, 6 includes a number of connectors (not shown), a plurality of circuit breakers 34 each including a body 35 with at least one line terminal 36 and at least one load terminal 38, and a circuit structure supporting the circuit breakers 34 and electrically interconnecting the at least one line terminal 36 and the at least one load terminal 38 of each of the circuit breakers 34 with the number of connectors; each of the circuit breaker 34 having a body 35 with an outwardly extending movable handle 39. As is known, the handle 39 may be actuated, typically by an in/out motion, to open and close, or following a trip incident, reset the circuit breaker 34. The circuit breakers 34 have an electrically conductive surface 37. In an exemplary embodiment, each circuit breaker 34 is a plug-in circuit breaker assembly 34A such as that shown and described in U.S. patent application Ser. No. 13/086,442, filed on Apr. 14, 2011, which is assigned to Eaton Corporation and incorporated herein by reference. In another exemplary embodiment, each circuit breaker 34 is an AFCI 34B or a plug-in AFCI 34C.

As shown in FIG. 3, each circuit breaker module 4, 6 also includes a frame assembly 80, a number of circuit breakers 34 (as noted above), and a faceplate assembly 100. The circuit breaker module frame assembly 80 has a generally planar front member 82 and a generally planar back member 84. The circuit breaker module frame assembly front member 82 is electrically conductive. In an exemplary embodiment, the circuit breaker module frame assembly front member 82 is an electrically conductive thermoplastic such as, but not limited to, a thermally conductive liquid crystal polymer, or "LCP," thermoplastic. The frame assembly front member 82 has a front side 94, a hack side 95, and defines an opening 90 sized to correspond to the faceplate 110 (described below). The frame assembly front member opening 90 has a mounting ledge 96. That is, the frame assembly front member opening mounting ledge 96 is a ledge extending into the frame assembly front member opening 90 whereby the frame assembly front member opening mounting ledge 96 has a smaller cross-sectional size than the frame assembly front member opening 90. The frame assembly front member opening mounting ledge 96 is exposed. That is, if the circuit breaker module frame assembly 80 is coated, e.g. painted, the frame assembly front member opening mounting ledge 96 is either not coated or has the coating removed. Alternatively, or in addition to an exposed frame assembly front member opening mounting ledge 96, the outer surface of the circuit breaker module frame assembly front member 82 about the frame assembly front member opening 90 may be exposed. Similarly, the frame assembly front member back side 95 is exposed. Thus, both the frame assembly front member opening mounting ledge 96 and the frame assembly front member back side 95 are electrically conductive. That is, a current may pass through the frame assembly front member opening mounting ledge 96 and the frame assembly front member back side 95 and to any element coupled directly, or indirectly via another conductive element, to either of the frame assembly front member opening mounting ledge 96 and the frame assembly front member back side 95.

In an exemplary embodiment, the frame assembly back member 84 is a circuit board having electrical conductors 83. The frame assembly back member 84 includes AFCI detection sensing electronics 85 (shown schematically). The AFCI detection sensing electronics 85 are in electronic communication with the circuit breakers 34. The frame assembly front member 82 and the frame assembly back member 84 are spaced from each other and define an enclosed space 86. That is, the frame assembly members 82, 84 may include, for example, posts 88 extending from one of either the front member 82 or the back member 84. The posts 88 may have a coupling 89 on their distal ends structured to be coupled to the other of either the front member 82 or the back member 84.

As shown in FIG. 6, the faceplate assembly 100 includes a faceplate 110 and a number of electrically conductive bushings 120. The faceplate 110 includes a planar member 112 with a first side 114 and a second side 116. The planar member 112 has a number of openings 118 therethrough. The faceplate openings 118 are sized to correspond to the size of the circuit breaker handles 39 and to allow the circuit breaker handles 39 to pass through the planar member 112. The planar member 112 has a number of fastener openings 115 therethrough. Faceplate fasteners 160 extend through the faceplate fastener openings 115. The faceplate 110 is electrically conductive. In an exemplary embodiment, the faceplate 110 is an electrically conductive thermoplastic, such as, but not limited to a thermally conductive LCP thermoplastic.

Each conductive bushing 120 is disposed adjacent a faceplate planar member opening 118. In an exemplary embodiment, each conductive bushing 120 is a torus having an opening (not shown), or substantially similar shape. Each conductive bushing 120 is disposed on planar member second side 116 with each torus disposed about a faceplate opening 118. Each conductive bushing 120 is in electrical communication with faceplate 110 and, in an exemplary embodiment, each conductive bushing 120 is directly coupled to planar member second side 116. In an alternate embodiment, each conductive bushing 120 is disposed on a circuit breaker 34 and, more specifically about handle 39. In this embodiment, each conductive bushing 120 is in electrical communication with the circuit breaker 34 to which it is coupled. As noted below, regardless of the initial location of each conductive bushing 120, each conductive bushing 120 is eventually disposed between planar member second side 116 and a circuit breaker 34. More specifically, each conductive bushing 120 is coupled to, or directly coupled to, the planar member second side 116 and a circuit breaker 34. Thus, each conductive bushing 120 is in electrical communication with both planar member second side 116 and a circuit breaker 34.

Assembling the circuit breaker module 4 includes the following steps. Disposing 200 the circuit breaker 34 in the frame assembly enclosed space 86. The circuit breaker at least one line terminal 36 and at least one load terminal 38 are coupled to, and are in electrical communication with, the frame assembly back member 84. The faceplate planar member 112 is disposed within the frame assembly front member opening 90 with the circuit breaker handles 39 extending through the faceplate planar member openings 118. Thus, the step of disposing 200 the circuit breaker 34 in the frame assembly enclosed space 86 includes the step of positioning 202 a circuit breaker with the circuit breaker handle 39 extending through a faceplate planar member opening 118 and creating 204 a path for electrical communication between the circuit breaker 34, the conductive bushing 120 and the faceplate planar member 112. That is, each conductive hushing 120 is coupled to, and in an exemplary embodiment, directly coupled to, the planar member second side 116 and a circuit breaker 34.

The faceplate planar member second side 116 is coupled to, and in an exemplary embodiment, directly coupled to, the frame assembly front member opening mounting ledge 96. Thus, the faceplate 110 is in electrical communication with the circuit breaker module frame assembly 80. The faceplate fasteners 160 may be used to couple the faceplate 110 with the circuit breaker module frame assembly 80. In this configuration, the circuit breakers 34 are coupled to, and in an exemplary embodiment, directly coupled to a conductive bushing 120. Thus, each circuit breaker 34 is in electrical communication with the circuit breaker module frame assembly 80. That is, there is a conductive path extending from each circuit breaker 34 through a conductive bushing 120 and the faceplate 110 to the circuit breaker module frame assembly 80. Thus, each circuit breaker 34 is in electrical communication with the faceplate 110 whereby a current may pass from the circuit breaker 34 to the frame assembly front member 82.

The method includes the further step of disposing 210 the circuit breaker module 4 in the circuit breaker panel 2. More specifically, circuit breaker module 4 is disposed in circuit breaker panel frame 10 and coupled thereto by fasteners 48. In this configuration, frame assembly front member back side 95 is coupled to, and in an exemplary embodiment, directly coupled to circuit breaker panel 2. Thus, frame assembly front member hack side 95 is in electrical communication with the circuit breaker panel 2. As the panel 2, and more specifically the panel frame 10, is grounded, the circuit breakers 34 are grounded via being in electrical communication with the circuit breaker panel 2. That is, as noted above, there is an electrical path extending from each circuit breaker 34 through a conductive bushing 120, the faceplate 110 to the circuit breaker module frame assembly 80, and, the circuit breaker module frame assembly 80 is in electrical communication with the circuit breaker panel 2. As noted above, the circuit breaker 34 may be a plug-in circuit breaker and/or an AFCI. Thus, the step of disposing 200 the circuit breaker 34 in the frame assembly enclosed space 86 includes the step of employing 212 a plug-in circuit breaker or the step of employing 214 an AFCI.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:
1. A circuit breaker module structured to be disposed in an electrically conductive panel, the circuit breaker module comprising:
  a frame assembly, a faceplate assembly, and a number of circuit breakers;
  said circuit breakers having an electrically conductive surface and an extending handle;

said frame assembly having a front member and a back member, said frame assembly front member and said frame assembly back member being spaced from each other and defining an enclosed space;

said frame assembly front member being electrically conductive;

said faceplate assembly having an electrically conductive faceplate said faceplate being a planar member with a number of openings therein;

said faceplate coupled to said frame assembly front member;

said circuit breaker disposed in said frame assembly enclosed space; and wherein said circuit breaker is in electrical communication with said faceplate and said frame assembly front member, whereby a current may pass from said circuit breaker to said frame assembly front member.

2. The circuit breaker module of claim 1 wherein:

said faceplate assembly includes a number of electrically conductive bushings;

each said bushing disposed adjacent a faceplate opening, each said bushing being in electrical communication with said faceplate; and wherein, when a circuit breaker is disposed in said frame assembly enclosed space with said circuit breaker handle extending through a faceplate opening, a bushing will be in electrical communication with both said circuit breaker and said faceplate and will allow a current to pass therethrough.

3. The circuit breaker module of claim 2 wherein each said bushing is an electrically conductive thermoplastic.

4. The circuit breaker module of claim 1 wherein said faceplate is an electrically conductive thermoplastic.

5. The circuit breaker module of claim 4 wherein said faceplate is a thermally conductive LCP thermoplastic.

6. The circuit breaker module of claim 1 wherein said frame assembly front member is an electrically conductive thermoplastic.

7. The circuit breaker module of claim 1 wherein:

said frame assembly includes AFCI detection sensing electronics; and said detection sensing electronics in electrical communication with said faceplate whereby said detection sensing electronics are grounded via said faceplate.

8. The circuit breaker module of claim 1 wherein:

said frame assembly front member has a front side, a back side, and defines an opening sized to correspond to said faceplate;

said frame assembly front member opening having a mounting ledge;

said frame assembly front member opening mounting ledge being electrically conductive;

said faceplate disposed in said frame assembly front member opening and being coupled to said frame assembly front member opening mounting ledge (96);

said frame assembly front member back side structured to be coupled to, and in electrical communication with, said panel.

9. The circuit breaker module of claim 1 wherein each said circuit breaker is a plug-in circuit breaker.

10. The circuit breaker module of claim 1 wherein each said circuit breaker is an AFCI.

11. The circuit breaker module of claim 1 wherein the exclusive ground current path for the circuit breakers is via the faceplate.

12. A method of electrically grounding a circuit breaker a panel, the panel being an electrically conductive material, said circuit breaker disposed in a circuit breaker module, said circuit breaker module including a frame assembly, a faceplate assembly, said circuit breaker having an electrically conductive surface and an extending handle, said frame assembly having a front member and a back member, said frame assembly front member and said frame assembly back member being spaced from each other and defining an enclosed space said frame assembly front member being electrically conductive, said faceplate assembly having an electrically conductive faceplate, said faceplate being a planar member with a number of openings therein, said faceplate coupled to said frame assembly front member, and wherein said method comprising the steps of:

disposing said circuit breaker in said frame assembly enclosed space, said circuit breaker being in electrical communication with said faceplate whereby a current may pass from said circuit breaker to said frame assembly front member;

disposing said circuit breaker module in said panel, said circuit breaker module in electrical communication with said panel, whereby a current may pass from said circuit breaker module to said panel; and wherein the circuit breakers are grounded via being in electrical communication with said panel.

13. The method of claim 12 wherein said faceplate assembly includes a number of electrically conductive bushings, each said bushing disposed adjacent a faceplate opening, each said bushing being in electrical communication with said faceplate whereby a current may pass from each said bushing to said faceplate, and wherein said step of disposing said circuit breaker in said frame assembly enclosed space includes the step of:

positioning a circuit breaker with said circuit breaker handle extending through a faceplate opening; and creating a path for electrical communication between said circuit breaker, said bushing and the faceplate planar member.

14. The method of claim 12 wherein said step of disposing said circuit breaker in said frame assembly enclosed space includes the step of employing a plug-in circuit breaker.

15. The method of claim 12 wherein said step of disposing said circuit breaker in said frame assembly enclosed space includes the step of employing an AFCI.

* * * * *